April 28, 1959  TAKEO TSUCHIKAWA  2,883,894
GEAR ROLLING MACHINE
Filed Jan. 18, 1956
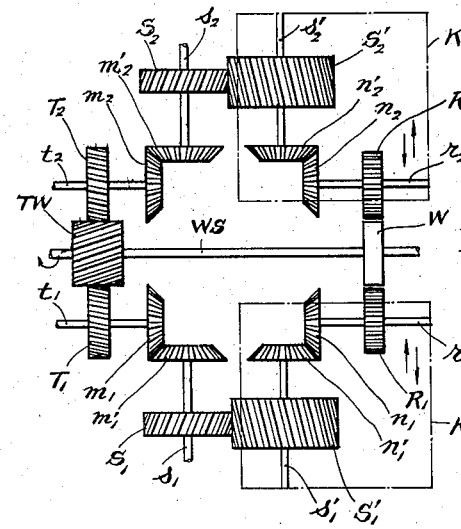
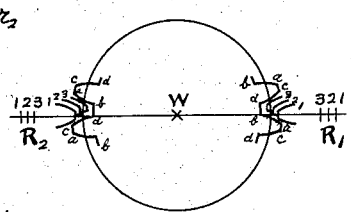
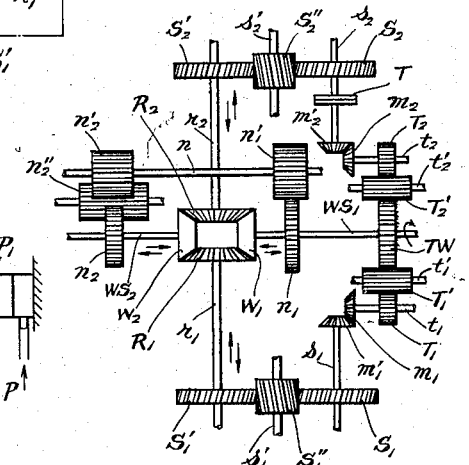
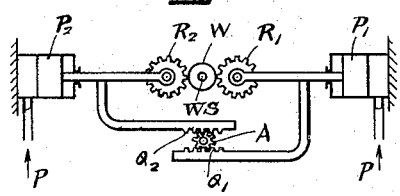
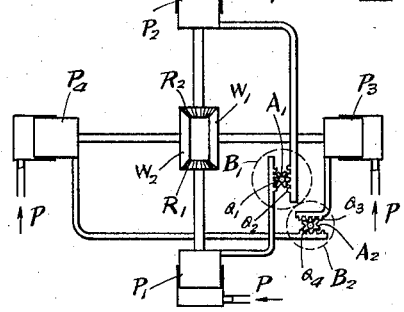
INVENTOR.
TAKEO TSUCHIKAWA
BY
ATTORNEY.

United States Patent Office 2,883,894
Patented Apr. 28, 1959

2,883,894

GEAR ROLLING MACHINE

Takeo Tsuchikawa, Sendai, Japan

Application January 18, 1956, Serial No. 559,995

Claims priority, application Japan March 31, 1955

4 Claims. (Cl. 80—16)

This invention relates to a gear rolling machine and more particularly to such a machine which enables the manufacture of gears of various types by a rolling process with accuracy and ease.

In the art of manufacturing gears by the rolling process, a gear blank and a die-roller are rotated and the die-roller is progressively pressed into the outer surface of the gear blank to afford plastic deformation thereof so that gear teeth are built up. In this case if the gear rolling is carried out in one direction of rotation, raise-up of the teeth in the periphery of the gear blank occurs asymmetrically at the driving and back sides of the teeth because of the fact that the application of force is different, and this results in the asymmetrical formation of the teeth. Moreover, the metal structure of the gear also becomes asymmetrical owing to the unequal working of the respective sides of the gear teeth.

To avoid the above mentioned defects, a gear rolling machine has been proposed in which the direction of rotation of the machine is frequently reversed during the rolling operation so that the opposite side faces of the gear teeth serve alternatively as the driving faces.

However, damage to the machine will frequently occur owing to the violent forces which may be produced by the alternative change of rotating direction during the rolling operation. The teeth of the gear blank should always be maintained in the same phase as those of the die-roller. To maintain the same phase even in the reverse direction of rotation of the machine, even relatively slight clearances in the gear arrangement of the machine must be avoided. For this reason it is very difficult to make such a machine. Moreover, although a machine is accurately manufactured, it will tend to have a certain clearance after being used for a short time. With this machine it is difficult to make gears having high accuracy by a rolling operation. Furthermore, with the machine of the prior art, deformation occurs in the teeth of the gear blank which are engaged with the teeth of the die-roller during the reversing operation. This is another reason why desired accurate gears can not be made by the machine above referred to. Besides, it has a disadvantage that it takes a considerably long time in the rolling process because of the fact that the direction of rotation is needed to be frequently reversed in the operation of the machine.

An object of this invention is to provide a gear rolling machine which rotates in one direction to manufacture gears having symmetrical teeth with superior accuracy in a comparatively short time.

Another object of this invention is to provide a gear rolling machine which is simple and compact in construction and easy to manufacture.

Further objects, features and advantages of this invention will be understood from the following description taken in connection with the accompanying drawings, in which:

Fig. 1 is a plan schematic plan view of an arrangement in accordance with this invention for manufacturing spur or helical gears.

Fig. 2 is a diagram illustrating the die-rollers of Figure 1 forming teeth in a gear blank.

Fig. 3 is a schematic plan view of another arrangement in accordance with this invention for manufacturing a bevel gear.

Fig. 4 shows a mechanism for pressing two die-rollers into a gear blank, and

Fig. 5 shows another mechanism for pressing two pairs of die-rollers into respective gear blanks.

Referring to Fig. 1, W is a gear blank which is mounted on a work shaft WS. $R_1$ and $R_2$ are die-rollers which are respectively mounted on intermediate shafts $r_1$ and $r_2$ arranged parallel to the shaft WS and at the opposite sides thereof. TW represents a timing gear which is mounted on the shaft WS. $T_1$ and $T_2$ are timing gears which are mounted on intermediate shafts $t_1$ and $t_2$ arranged parallel to the shaft WS at the opposite sides thereof. The gears $T_1$ and $T_2$ mesh with gear TW to rotate the die-rollers $R_1$ and $R_2$ and the gear blank W in synchronism and at a constant ratio of revolution so that die-rollers $R_1$ and $R_2$ can divide the outer surface of the gear blank W into the desired number of teeth. When the shaft WS is rotated by an electric motor, for example, the gear blank W is directly rotated. The revolving force of the shaft WS is transmitted from the gear TW to gear $T_1$. The die-roller $R_1$ is now rotated from the timing gear $T_1$ through a series of transmission gears $m_1$, $m_1'$, $S_1$, $S_1'$, $n_1'$ and $n_1$ which are respectively mounted on the intermediate shafts $t_1$, $s_1$, $s_1'$ and $r_1$. The die-roller $R_2$ is similarly rotated from the timing gear $T_2$ through a series of transmission gears $m_2$, $m_2'$, $S_2$, $S_2'$, $n_2'$ and $n_2$ which are respectively mounted on intermediate shafts $t_2$, $s_2$, $s_2'$, and $r_2$. The work shaft WS is rotatably mounted on fixed bearings and gears $T_1$, $m_1$, $m_1'$ $S_1$, $T_2$, $m_2$, $m_2'$ and $S_2$ are secured against rotation relative to their respective shafts. The shafts $r_1$ and $s_1'$ are so disposed on a sliding head $K_1$ that the die-roller $R_1$ as well as gears $S_1'$, $n_1'$ and $n_1$ can be moved to and fro with respect to the work shaft WS. Similarly, the shafts $r_2$ and $s_2'$ are so placed on another sliding head $K_2$ that the die-roller $R_2$ with gears $S_2'$, $n_2'$, and $n_2$ can also be moved to and fro with respect to the work shaft WS. In this to-and-fro-motion the gears $S_1'$ and $S_2'$ are respectively shifted along their axes of rotation. For this reason, either one or the other of gears $S_1$, $S_1'$ and either one or the other of gears $S_2$, $S_2'$ say $S_1'$, and $S_2'$ are respectively so constructed that the face widths thereof are respectively larger than those of the others so as not to disengage from each other within the range of movement of sliding heads $K_1$ and $K_2$. If spur gears serve as these shifting gears $S_1$, $S_1'$ and $S_2$, $S_2'$ no angular displacement occurs between gears $S_1$ and $S_2$, and $S_1'$ and $S_2'$ respectively so that the revolutions of the pair of timing gears TW, $T_1$ and $T_2$ are transmitted to the gear blank W and the die-rollers $R_1$, $R_2$ without angular displacement. If, however, helical gears are used as the gears $S_1$, $S_1'$ and $S_2$, $S_2'$ as actually shown in Figure 1, a certain angular displacement occurs which is a function of the distance they are shifted relative to each other and the helix angle of the helical gears. If the helical gear $S_1$, $S_1'$ and $S_2$, $S_2'$ are provided with the same helix angles in the same directions, the die-rollers $R_1$ and $R_2$ will have angular displacements which are equal but opposite in direction.

Fig. 2 illustrates gear rolling steps performed by the ararngement of Figure 1 as above explained. During rotation, the die-roller $R_1$ gradually approaches and is worked into the face indicated at $c$—$d$ of each of the teeth, while the die-roller $R_2$ is worked into the opposite face $a$—$b$ of each of the teeth. That is, the die-roller $R_1$ is driven in contact with the face $c$—$d$ of the gear blank to be rolled and not with the face $a$—$b$ thereof, whereas the die-roller $R_2$ is simultaneously driven in contact with the face $a$—$b$ and not with the face $c$—$d$. Accordingly, the two die-rollers will effect rolling operation on the opposite driving faces of the gear blank, so that a gear having symmetrical teeth can be made.

The degree of angular displacement to be given to the die-roller depends upon the gears to be rolled. In the arrangement according to this invention, however, the helix angles of the helical gears $S_1$, $S_2$ and $S_1'$, $S_2'$ can be so selected as to obtain adequate angular displacements.

The above description has been made, by way of example, in connection with the rolling process of spur or helical gears; as a further example, an arrangement for producing bevel gears will now be explained referring to Fig. 3. $W_1$ and $W_2$ are gear blanks which are respectively mounted on two work shafts $WS_1$ and $WS_2$ alined with each other. $R_1$ and $R_2$ represent die-rollers which are respectively mounted on two shafts $r_1$ and $r_2$ alined with each other and arranged perpendicularly to the shafts $WS_1$ and $WS_2$. $TW$ is a timing gear which is mounted on the work shaft $WS_1$. $T_1$ and $T_2$ are timing spur gears which are mounted on two intermediate shafts $t_1$ and $t_2$ arranged parallel to the shaft $WS_1$ and at opposite sides thereof for respectively driving the die-rollers $R_1$ and $R_2$. The timing gears $T_1$ and $T_2$ mesh and cooperate with the timing gear $TW$ through respective gears $T_1'$ and $T_2'$ which are mounted respectively on two intermediate shafts $t_1'$ and $t_2'$. The timing gear $T_1$ is connected with die-roller $R_1$ through a series of gears $m_1$, $m_1'$, $S_1$, $S_1''$, and $S_1'$ which are respectively mounted on the respective shafts $t_1$, $s_1$, $s_1'$ and $r_1$. Similarly, the timing gear $T_2$ is connected with the die-roller $R_2$ through another series of gears $m_2$, $m_2'$, $S_2$, $S_2''$, and $S_2'$ which are respectively mounted on the respective shafts $t_2$, $s_2$, $S_2''$ and $r_2$. $T$ is a phase adjusting coupling.

Parallel to the shafts $WS_1$ and $WS_2$ is arranged another shaft $n$ on which a gear $n_1'$ meshed with the gear $n_1$ and another gear $n_2'$ meshed with a gear $n_2$ through an intermediate gear $n_2''$ are mounted.

The operation of the above mentioned arrangement is as follows:

When the work shaft $WS_1$ on which the gear blank $W_1$ is mounted is driven by a motor not shown, the gear blank $W_2$ is rotated through the series of the transmission gears $n_1$, $n_1'$, $n_2'$, $n_2''$ and $n_2$. The timing gear $T_1$ is driven from the timing gear $TW$ through the transmission gear $T_1'$. And at the same time the die-roller $R_1$ is also rotated through the transmission gears $T_1$, $m_1$, $m_1'$, $S_1$, $S_1''$ and $S_1'$. Similarly the die-roller $R_2$ is rotated from the timing gear $TW$ through the transmission gears $T_2'$, $T_2$, $m_2$, $m_2'$, $S_2$, $S_2''$ and $S_2'$. The gears $T_1'$, $T_1$, $m_1$, $m_1'$, $S_1$, $S_1''$, $T_2'$, $T_2$, $m_2$, $m_2'$, $S_2$, $S_2''$, $n_1'$ and $n_2$ are mounted on their respective shafts at the positions thereof. Upon the bevel gear rolling process, the gear blanks and the die-rollers respectively approach or separate from each other a shown by the arrow with a certain speed. That is, the gear blank $W_1$ is shifted with gears $n_1$ and $TW$ along their axes of rotation. Similarly the gear blank $W_2$ is shifted with the gear $n_2$, the die-roller $R_1$ with the gear $S_1'$, and the die-roller $R_2$ with the gear $S_2'$ along their respective axes respectively. Upon the axial shift of the gear blank $W_1$, the gear $n_1$ is shifted along the axial direction with the meshing condition with the gear $n_1'$ which has a comparatively long face width of teeth, and the gear $TW$ is also shifted along its axial direction with the meshing condition with the gears $T_1'$ and $T_2'$ both of which have respectively face widths of teeth long enough to mesh with the gear $TW$ during shifting. The gear blank $W_2$ and the gear $n_2$ are simultaneously shifted along their axes, the latter meshing with the gear $n_2''$ the teeth width of which is long enough not to disengage from the gear $n_2$ during its shifting. These shifting gears in this case, are spur gears so that the angular displacement does not occur, and the gear blanks $W_1$ and $W_2$ are rotated in synchronism with the timing gear $TW$. At the same time the die-roller $R_1$ is shifted along its axis with the gear $S_1'$ which meshes with the gear $S_1''$ having long face widths of teeth and the die-roller $R_2$ is also shifted along its axis with the gear $S_2'$ which meshes with the gear $S_2''$ having long face widths of teeth. In this case if spur gears are used as the shifting gears $S_1$, $S_1''$, $S_1'$, $S_2$, $S_2''$ and $S_2'$ there is no angular displacement between these meshing gears, but if helical gears are adopted, there occurs a certain angular displacement between the meshing gears according to the helix angles and shifting distance of the helical gears. Accordingly it will be understood that by using helical gears having desired helix angles as the shifting gears, bevel gears of symmetrical tooth form can be produced while using a unidirectionally rotating prime mover similarly to the case of rolling spur gears and helical gears as hereinbefore described.

In order to operate completely the arrangement shown in Fig. 1 the die-rollers $R_1$ and $R_2$ should approach the gear blank $W$ with the same displacement. To the same end the die-rollers $R_1$ and $R_2$ in Fig. 3 are also desired to approach respectively the gear blank $W_1$ and $W_2$ with the same speed and at the same time the gear blanks $W_1$ and $W_2$ are respectively needed to approach the die-rollers $R_1$ and $R_2$ at the same speed and with the constant ratio of speeds of the die-rollers.

For this purpose, the arrangements shown in Figs. 4 and 5 are preferably adopted. In Fig. 4, $W$ is a gear blank for a spur gear, $R_1$ and $R_2$ are die-rollers, $P_1$ and $P_2$ pistons which push the die-rollers $R_1$ and $R_2$ with the same oil pressure $P$, and $Q_1$ and $Q_2$ represent racks which are respectively engaged with a pinion $A$ and which are respectively connected with the piston $P_1$ and $P_2$. The shaft $WS$ of the gear blank $W$ has a fixed bearing. By this arrangement it will be apparent that the die-rollers $R_1$ and $R_2$ can approach the gear blank $W$ with the same speed.

In Fig. 5, $W_1$ and $W_2$ are gear blanks for helical gears, $R_1$ and $R_2$ are die-rollers for helical gears, $P_1$, $P_2$, $P_3$ and $P_4$ represent respectively pistons which push respectively die-rollers $R_1$, $R_2$ and gear blanks $W_1$, $W_2$ with the same oil pressure $P$, and $Q_1$, $Q_2$ are racks which are engaged with a pinion $A_1$ and which are respectively connected with the pistons $P_1$ and $P_2$. $Q_3$ and $Q_4$ are racks which are meshed with another pinion $A_2$ and which are respectively connected with the pistons $P_3$ and $P_4$. On the shafts of pinions $A_1$ and $A_2$ are respectively mounted gears $B_1$ and $B_2$ which are meshed with each other and which have the gear ratio corresponding to the desired ratio of speeds of the gear blank and the die-roller. By this arrangement it will be clear that the die-rollers approach each other with the same speed and the gear blanks $W_1$ and $W_2$ also approach each other with the same speed so that the ratio of revolutions of $R_1$ and $R_2$ to the revolutions of $W_1$ and $W_2$ becomes the desired value.

What is claimed is:

1. A gear rolling machine comprising a first pair of work shafts arranged on one line, two gear blanks respectively mounted on said work shafts, a second pair of work shafts arranged perpendicularly to said first pair of work shafts on one line, a pair of bevel gear formed master die-roller which are respectively mounted on said second pair of work shafts and which are respectively to be pressed onto said gear blanks from the opposite sides thereof, a pair of timing gears which are respectively connected with said first pair of work shafts, a pair of gear arrangements for respectively connecting said timing gears and said second pair of work shafts, a pair of sliding gears each being included in each of said gear arrangements and meshing together so as to be shifted axially, thereby enabling each of said second pair of work shafts to shift axially, and another pair of gear arrangements for respectively connecting one of said first pair of work shafts with the other thereof in such a way that said work shafts can be axially shifted.

2. A gear rolling machine comprising a work shaft on which a gear blank is to be mounted, a master die-roller, timing means operatively connected with said work shaft and said master die-roller for producing substantially conjoint rotation of said master die-roller and said work shaft, means for relatively moving said master die-roller progressively toward said work shaft to progressively form gear teeth in a gear blank on said shaft, and means for imparting a progressive angular displacement of the master die-roller relative to the work shaft during progressive relative movement of the master die-roller toward the work shaft.

3. The machine of claim 2 wherein said means for imparting progressive angular displacement comprises relatively axially shiftable helical gear means one having a direct drive coupling with said work shaft and the other having a direct drive coupling with said master die-roller and being axially movable with said master die-roller.

4. A gear rolling machine comprising a work shaft on which a gear blank is to be mounted, a pair of master die-rollers disposed for movement toward the work shaft from opposite sides of said work shaft, means for conjointly driving said master die-rollers and said work shaft, and means accommodating bodily movement of said master die-rollers toward said work shaft while imparting progressive opposite angular displacements of the respective master die-rollers relative to the work shaft.

References Cited in the file of this patent

UNITED STATES PATENTS

| | | |
|---|---|---|
| 1,001,799 | Anderson | Aug. 29, 1911 |
| 1,240,914 | Anderson | Sept. 25, 1917 |
| 2,423,932 | Finzel | July 15, 1947 |

FOREIGN PATENTS

| | | |
|---|---|---|
| 517,039 | France | Apr. 29, 1921 |